United States Patent [19]

Prunier

[11] Patent Number: 4,643,826
[45] Date of Patent: Feb. 17, 1987

[54] FILTRATION APPARATUS COMPRISING ENDLESS BELTS PASSING BETWEEN CLAMPING PLATES

[75] Inventor: Robert G. Prunier, Le Mele Sur Sarthe, France

[73] Assignee: Guinard de Separation, Saint-Cloud, France

[21] Appl. No.: 790,984

[22] Filed: Oct. 24, 1985

Related U.S. Application Data

[63] Continuation-in-part of Ser. No. 668,199, Dec. 7, 1984, abandoned, which is a continuation of Ser. No. 545,866, Oct. 27, 1983, abandoned, which is a continuation of Ser. No. 362,592, Mar. 29, 1982, abandoned.

[30] Foreign Application Priority Data

Apr. 13, 1981 [FR] France ................. 81 07372

[51] Int. Cl.[4] ................... B01D 25/14; B01D 33/04
[52] U.S. Cl. ......................... 210/225; 210/350; 210/400
[58] Field of Search .............. 100/118–120, 100/151, 152, 196; 210/225, 350, 386, 397, 400, 401

[56] References Cited

U.S. PATENT DOCUMENTS

| | | | |
|---|---|---|---|
| 1,958,279 | 5/1934 | Morgan | 210/400 X |
| 2,932,399 | 4/1960 | Emele | 210/225 |
| 3,342,123 | 9/1967 | Ermakov et al. | 210/400 X |
| 3,605,607 | 9/1971 | Gujer | 210/400 X |
| 3,870,641 | 3/1975 | Pierson | 210/400 |
| 3,942,433 | 3/1976 | Wohlfarter | 210/400 X |
| 3,951,809 | 4/1976 | Kollmar | 210/400 X |
| 3,979,296 | 9/1976 | Bastgen | 210/400 X |
| 4,127,487 | 11/1978 | Havalda | 210/350 |
| 4,153,550 | 5/1979 | Lautrette | 210/350 X |
| 4,159,947 | 7/1979 | Brooks et al. | 210/386 X |
| 4,181,616 | 1/1980 | Bahr | 210/386 X |
| 4,211,762 | 7/1980 | Bastgen | 100/120 X |
| 4,292,173 | 9/1981 | Parmentier | 210/225 X |
| 4,303,523 | 12/1981 | Ruppnig | 210/386 |
| 4,346,003 | 8/1982 | Polyakov et al. | 210/225 |

FOREIGN PATENT DOCUMENTS 2389401  12/1978  France .
1034143   8/1981  Japan ................. 210/400

Primary Examiner—Robert Spitzer
Attorney, Agent, or Firm—Sixbey, Friedman & Leedom

[57] ABSTRACT

Filtration apparatus, comprising two endless filter belts (1, 5) parallel to each other over one strand from a point where they come together, then moving away from each other over the remaining strand, a pair of facing plates (P1 to P10) between which the parallel strand passes, a mechanism (27) for temporarily moving the plates (P1 to P10) towards each other until the belts (1, 5) are clamped together for temporarily immobilizing the belts, a first means (2) for increasing the path of travel of the belts (1, 5) between the point where they come together and the pair of plates at the moment when the mechanism (27) immobilizes the belts by clamping them, and a second means (18, 23) for reducing the path of travel of the belts, at this same moment, between the point where they move away and the point where they come together.

9 Claims, 2 Drawing Figures

FILTRATION APPARATUS COMPRISING ENDLESS BELTS PASSING BETWEEN CLAMPING PLATES

This application is a continuation-in-part of application Ser. No. 668,199, filed Dec. 7, 1984, now abandoned, which application is a continuation of application Ser. No. 545,866, filed Oct. 27, 1983, now abandoned, which application is a continuation of application Ser. No. 362,592, filed Mar. 29, 1982, now abandoned.

This invention relates to filtration apparatus intended for expressing liquid from suspensions such as liquid slurries from purifying plants for urban or industrial waste and, more generally, for separating the solids from the liquid in a suspension.

Apparatus with pressing belts are already known, which comprise filter belts, travelling in pairs, along an arc of about 180°, around rollers. The greater of lesser tension of the filter belts over rollers of progressively smaller diameter results in progressively stronger pressing of the slurry (which has previously been drained) trapped between the two filter belts. The free water is then partially expelled through the filter belts.

For this separation of solid from liquid, the technique used is based on the technique of filtration under pressure. Therefore, the theory of this method applies and the results of the separation depend on the same parameters, particularly those defined when the machine is designed, namely:

the active surface of the filter belts
the pressure exerted
the period of time for which the pressure is effective.

For a given width of filter, this makes it possible to determine:

the total developed length of the active part of the filters, in the zones of travel over the rollers
the tension to which the filters are subjected
the diameter of the winding rollers for the filters
the speed at which the filters travel.

In order to improve the performance of the extraction process, it is necessary to:

(a) Exert greater and greater tractive efforts on the filter belts (for the pressure factor)

(b) Increase the number of rollers, the reduction in diameter of these rollers being limited by their resistance to bending (for the time factor). Consequently, machines of this type, which are becoming progressively more complex and expensive, since the maximum pressure is rapidly reached and the reliability of the filter belts is questionable, are unlikely to result in any serious progress.

The apparatus according to the invention, whilst still keeping an essentially continuous method of operation using endless filter belts, makes it possible to increase substantially the mechanical pressure to which the suspension is subjected and the duration of the pressing operation without affecting the flow rate, and also eliminates any connection between the filtration pressure and the tension of the filter belts, so that these belts are not exposed to excessive fatigue, and it also makes it possible to modulate the pressure during the filtration process.

The invention relates to a filtration apparatus, comprising two endless filter belts, parallel to each other over one strand then moving away from each other over the remaining strand, a pair of facing plates between which the parallel strand passes, a mechanism for temporarily bringing the plates towards each other until the endless belts are clamped against each other, a first device intended to increase the path of travel of the belts between the point where they come together and the first pair of plates, at the moment when the mechanism immobilizes the belts and clamps them together, and a second device intended to reduce the path of travel of the belts between the point where they move away and the point where they come together, at this same moment.

In this way, a certain continuity of operation is maintained. Moreover, the pressure is no longer supplied by the tension of the belts but by external plates moved by a mechanism such as a jack-type press.

According to the invention, a layer is deposited which is regular both from the thickness and the dry matter content standpoints. The drained paste continuously deposited on the horizontal or slightly inclined filtering belt is sandwiched between a filtering belt which covers it. The thus formed sandwich, after winding onto the storage loop drum, then provides during pressing between the first pair of plates, a cake having a regular thickness and whose dry material content is homogenous.

This is not the case with prior art devices. For example, the supply device described in French Pat. No. 2 389 410 (KLEIN) consisting of storing suspension R in admission channel 24 formed by filter clot 20, 21, for the fixing period of said cloths can only give a nonhomogeneous suspension. The lower zone of the funnel necessarily has a much higher dry matter concentration than the upper part. This leads to a poor distribution of the dry matter during the passage between plates 1 and 2.

Moreover, two additional disadvantages result from the introduction of the suspension, in the manner indicated in the Klein patent. The base of the funnel channel would contain a relatively resistant drained suspension, so that it would be necessary to pull strongly on the filtering belts and there could be a deterioration or even a tearing away of the lateral gaskets 14. Finally, during the movement of the filtering belts containing the suspension drained between the spaced plates, the belts would rub against the grooved surfaces 11, resulting in wear to both the bolts and the grooved surfaces.

According to a preferred feature of the present invention, there are several pairs of parallel plates between which the portions of the parallel strand pass successively and the mechanism for bringing the plates together and moving them apart is common to all the plates, so that various portions are clamped simultaneously. However, the clamping force can be regulated differently for the various pairs of plates, if elastic elements are interposed between the plates or incorporated in the plates and, for example, in this way a downstream portion may be clamped more tightly than an upstream portion.

Figure 1:
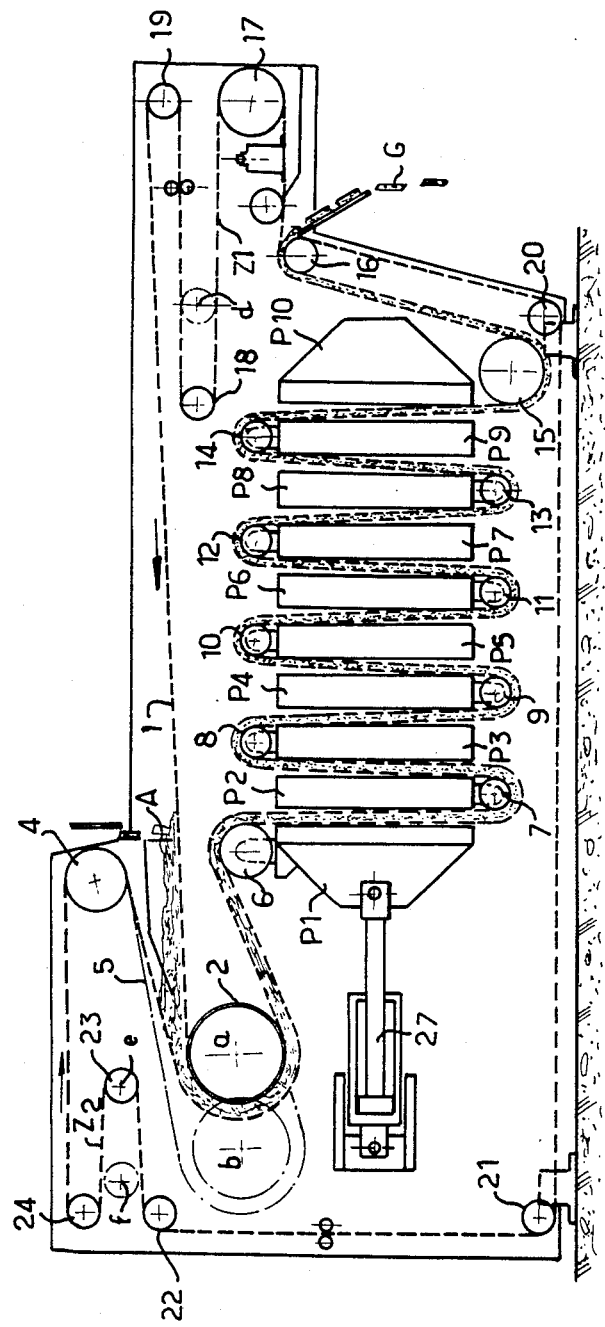
FIG. 1 is an elevation of an apparatus according to the invention.
Figure 2:
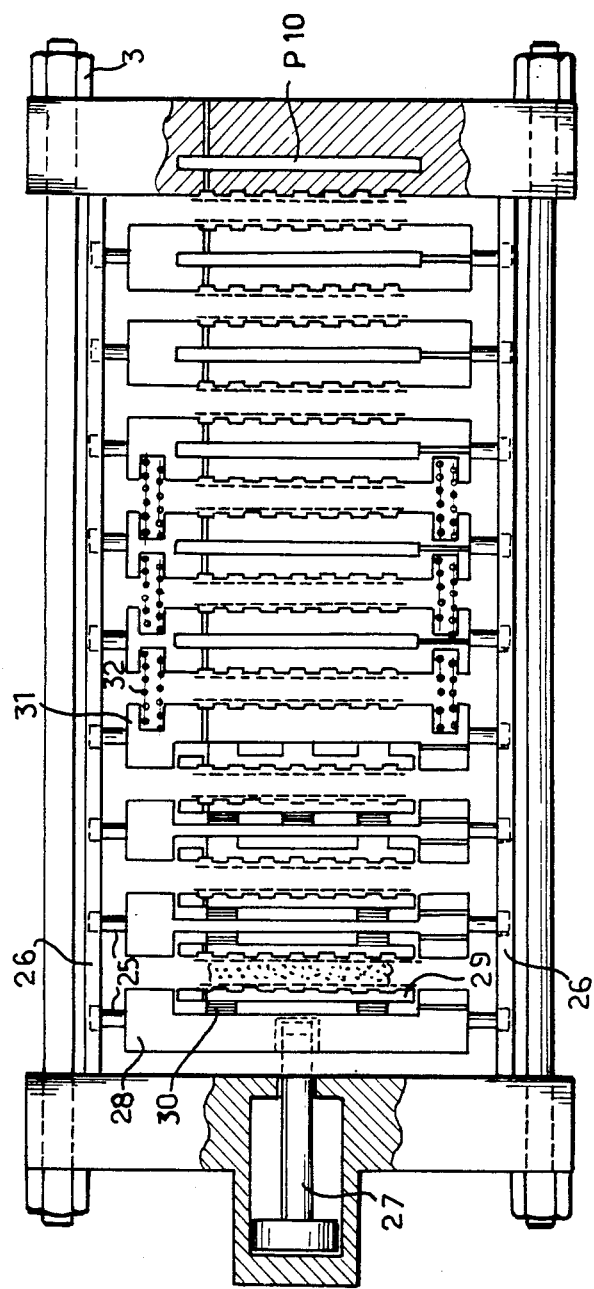
FIG. 2 is a partial plan view.

The apparatus comprises a conventional feed mechanism (not shown), for continuously supplying a paste having a consistency such that it can be pressed between two filter belts without flowing over the edges of these belts.

The drained paste A is received on a filter belt 1', which may be horizontal or slightly inclined, which is upstream, in the direction of travel of the endless belt 1, of a drum 2 with a horizontal axis, mounted on the side walls of the frame 3 of the apparatus, like all the other rollers of the apparatus, but capable of moving by horizontal translation, like all the other tensioning rolls and unlike the rollers.

From a drive roll 4 upstream of the drum 2, another filter belt 5 passes over the belt 1 around the drum 2, so that the paste is trapped between these belts.

The belts 1 and 5, after coming together, continue their course parallel to each other, passing over a roller 6 which guides the portion immediately downstream in a vertical descending direction, over a roller 7 which guides the portion immediately downstream in a vertical ascending direction, then in the same way over rollers 8 to 14, before emerging from a drive roll 15 along an inclined portion to pass over a roller 16 where the two belts 1 and 5 are separated and cease to be parallel. The belt 1 passes over a roller 17, then over a tensioning roll 18 before being guided back, by a roller 19, to below the feed mechanism. The belt 5 passes over rollers 20, 21, 22 and over a tensioning roll 23 before arriving at the roller 4 via a roller 24. The cake G formed by the filtered paste which has a uniform thickness and a homogeneous dry material content, is released by the belts 1, 5.

The vertical portions of the belts 1, 5 contained between the rollers 7 to 15 pass between the pairs of plates P1 to P10, respectively, these plates having a grooved and perforated surface. The plates P are mounted by means of lateral tenons 25 rolling on the rolling tracks 26 of the frame 3, with the exception of the plate P10 which is fixed in abutment on the frame 3. The plate P1 is integral with the horizontal rod of a jack 27. Each plate comprises a framework 28 and a pressure plate 29.

The jack transmits all the clamping force to the sandwich consisting of the belts 1 and 5 trapping between them the paste which is to be pressed. Between the plates P1/P2, P2/P3 and P3/P4, since the paste can no longer withstand all the clamping force without flowing, the pressure plates abut on the sandwich with only a pressure resulting from the compression of elastic studs 30 interposed between the framework 28 and the plate 29, whilst the plates make contact with one another at the portions 31 of their framework. Between the plates P4/P5, P5/P6 and P6/P7, the paste begins to be able to withstand a moderate pressure without flowing. The pressure plates 29 are integral with the frameworks without any elastic studs interposed. In order to limit the pressure on the sandwich, some of the clamping force of the jack 27 is counteracted by compression springs 32 provided in the lateral portions 31 of the support surfaces of the plates. Finally, between the plates P7/P8, P8/P9 and P9/P10, the sandwich of paste, now greatly filtered, withstands the maximum pressing equal to the clamping force of the jack 27.

The programme of phases of a cycle, namely:

(a) the clamping of the plates, (b) the continuation of the clamping operation throughout the pressing time, (c) the moving apart of the plates, is obtained by the action of a cam keyed on the shaft of the drive drum 4, this cam actuating the distributor of the hydraulic supply to the jack 27.

The rapid displacement, over a length equal to the height of the plates from the belts 1, 5, after the plates have been moved apart by the drive drum 15, is authorized by a means for detecting the "open press" position, placed on the plate P1.

The drive drum 4 is connected to its drive shaft by a free wheel system, the driving of the belts 1, 5 by the drum 15 being preponderant.

The horizontal translational movement of the tensioning rolls 2, 18 and 23 can be effected by systems of cables or chains, return pulleys and counterweights.

The operation of pressing the sandwich by means of the thrust of the jack V on the stack of plates P1 to P10, immobilizes the belts for a time "t". During the pressing time "t", the perforated drum 2 moves from a to b, thus absorbing the lengths of the filter belts 1, 5, which would otherwise accumulate upstream, these lengths being restored by the loops Z1 and Z2 formed by the drums 18 and 23, which move from c to d and from 3 to f. When the pressing time "t" has expired, the plates P move apart, the drive drum 4 drives the sandwich along by a length equal to the height of the plates. The loops Z1 and Z2 are re-formed by the displacement of the drums 18 and 23 from d to c and from f to e. The total pressing time "T" is equal to the product of $t \times$ by the number of vertical portions of the parallel strand. It is sufficient to add one pressing plate in order to increase "T" by the value of "t". The belts, in extension, are subjected only to the effort resulting from the sum of the effort caused by the displacement of the sandwich, the effort due to the bending of the sandwich during changes of direction, and the effort due to the initial tension required for adhesion to the drive rollers 4, 15. The filtration pressure now depends only on the clamping force of the plates P. Clamping by means of a hydraulic jack "V" makes it possible to achieve very high values when necessary.

What is claimed is:

1. Filtration apparatus comprising two endless filter belts parallel to each other over a parallel strand and independent of each other over the remaining strand, and a fixed feed means positioned along the remaining strand for continuously depositing a mixture of liquid and solid onto a horizontal or slightly inclined portion of one of the filter belts, the other of said filter belts joining said one of said filter belts downstream of said feed means for forming a pair of belts parallel to each other with said feed mixture sandwiched therebetween, a pair of facing plates between which belts of the parallel strand pass and downstream of which said filter belts move away from each other, a mechanism for temporarily moving the plates towards each other until said belts of said parallel strand are clamped together for momentarily immobilizing said belts, a first means, which is common to both belts, for increasing the path of travel of both belts together between the feed means and the pair of plates, said first means operative at the moment when the mechanism immobilizes the belts of said parallel strand by clamaping them, said first means comprising a first drum having a first axis and means for displacing said first axis to increase the path of travel of the belts, second means for reducing respectively the path of travel of each belt between the point where the belts move away from each other and a point upstream of the feed means, said second means operative at the moment when the mechanism immobilizes the belts of said parallel strand by clamping them, said second means comprising a second drum having a second axis, a third drum having a third axis and means for displacing said second and third axes to reduce the path of travel of the belts, the belts of said remaining strand continuing to run when said mechanism immobilizes the belts of said parallel strand, whereby said fixed feed means continuously feeds onto a continuously moving filter belt of said remaining strand.

2. The filtration apparatus of claim 1, wherein said first, second and third axes are displaceable in a direction parallel to the direction of arrival of said belts on said respective drums.

3. The filtration apparatus of claim 1, comprising a driving drum for driving one of said belts, said driving drum having a drive shaft, and a programming means for programming the cycles of actuation of said mechanism from the drive shaft.

4. The filtration apparatus of claim 1, comprising several pairs of facing plates between which said parallel strand passes, said mechanism temporarily moves the two plates of each pair towards each other, said mechanism being common to all pairs of plates, and elastic means for differently regulating the clamping force for each different pair of plates wherein the elastic means for regulating the clamping force comprise elastic elements interposed between the plates.

5. The filtration apparatus of claim 4, wherein first elastic elements for regulating the clamping force are incorporated in the facing surfaces of the plates of each pair.

6. The filtration apparatus of claim 5, wherein second elastic elements for regulating the clamping force are interposed between the facing surfaces of plates of adjacent pairs.

7. The filtration apparatus of claim 6, wherein said first elastic regulating elements are incorporated in the plates located upstream, in the direction of travel of the filter belts, of the pairs of plates between which said second elastic regulating elements are interposed.

8. The filtration apparatus of claim 4, wherein, in the most downstream pair of plates, the facing surfaces of two adjacent pairs come directly into contact with each other.

9. Filtration apparatus for expressing liquids from liquid-solid mixtures comprising two endless filter belts, means for driving each said filter belt and means guiding each said filter belt along a predetermined path and in a predetermined direction of movement, said filter belts moving in parallel spaced relationship over a parallel portion of their respective paths and independent of each other over a non-parallel portion of their respective paths, a fixed feed means positioned along one of said filter belts in the non-parallel portion of its path and upstream of the parallel portion of its path for continuously depositing a mixture of liquid and solid onto said one of the filter belts, the other of said filter belts forming a pair of parallel belts with said one of said filter belts at a point downstream of said feed means for sandwiching said deposited mixture therebetween, a pair of facing plates between which said filter belts pass when moving in parallel spaced relationship and downstream of which said filter belts move away from each other, a mechanism for temporarily moving the plates towards each other until the belts of said parallel portion are clamped together for momentarily immobilizing said belts, a first means, which is common to both belts, for increasing the path of travel of both belts together between a point downstream of the feed means and upstream of the pair of plates, said first means operative at the moment when the mechanism immobilizes the belts of the parallel portion by clamping them, said first means comprising a first drum having a first axis and means for displacing said first axis to increase the path of travel of the belts, second means for reducing respectively the path of travel of each belt along the non-parallel portion of its respective path between a point downstream of the pair of plates and a point upstream of the feed means, said second means operative at the moment when the mechanism immobilizes the belts of said parallel portion by clamping them, said second means comprising a second drum having a second axis, a third drum having a third axis and means for displacing said second and third axes to reduce the path of travel of the belts, the belts of said non-parallel portion continuing to run when said mechanism immobilizes the belts of said parallel portion and said fixed feed means continuously feeding said mixture onto one of the continuously moving filter belts of said non-parallel portion, whereby the fixed feed means feeds continuously onto a continuously moving belt of said non-parallel portion while said facing plates express liquid from the liquid-solid mixture during immobilization of the belts of said parallel portion.

* * * * *